United States Patent
Wicki et al.

[19]

[11] Patent Number: 6,122,709
[45] Date of Patent: Sep. 19, 2000

[54] CACHE WITH REDUCED TAG INFORMATION STORAGE

[75] Inventors: Thomas M. Wicki, Palo Alto; Meera Kasinathan, Sunnyvale; Ricky C. Hetherington, Pleasanton, all of Calif.

[73] Assignee: Sun Microsystems, Inc., Palo Alto, Calif.

[21] Appl. No.: 08/994,376

[22] Filed: Dec. 19, 1997

[51] Int. Cl.[7] .................................................. G06F 12/00
[52] U.S. Cl. ........................ 711/118; 711/122; 711/119; 711/120; 711/128
[58] Field of Search .................................. 711/122, 118, 711/119, 120, 121, 144, 145, 127, 128

[56] References Cited

U.S. PATENT DOCUMENTS

| | | | |
|---|---|---|---|
| 4,965,721 | 10/1990 | Holtey et al. | 709/212 |
| 4,969,122 | 11/1990 | Jensen | 365/49 |
| 5,133,058 | 7/1992 | Jensen | 395/400 |
| 5,136,700 | 8/1992 | Thacker | 711/122 |
| 5,623,627 | 4/1997 | Witt | 711/122 |
| 5,692,152 | 11/1997 | Cohen et al. | 711/140 |
| 5,813,031 | 9/1998 | Chou et al. | 711/122 |
| 5,878,268 | 3/1999 | Hagersten | 712/28 |

FOREIGN PATENT DOCUMENTS 0 795 828 A2  2/1997  European Pat. Off. .

OTHER PUBLICATIONS

Hong Wang et al.; CAT—Caching Address Tags a Technique for Reducing Area Cost of On–Chip Caches; Jun. 22, 1995; pp 381–390.

Yonghwan Lee et al., "Shared tag For MMU and Cache Memory", Semiconductor International Conference, vol. 1, pp. 77–80m Oct. 1997.

Hong Wang et al. "CAT—Caching Address Tags—A Technique For Reducing Area Cost of On–Chip Caches", pp. 381–390, Jun. 1995.

Article "Minimizing Area Cost of On–Chip Cache Memories by Caching Address Tags" by H. Wang et al., IEEE Transactions on Computers, vol. 46, No. 11, Nov. 1997, pp. 1187–1201.

Article "Decoupled Sectored Caches: Conciliating Low Tag Implementation Cost and Low Miss Ratio" by A. Seznec, 8345, Computer Architecture News 22, Apr., No. 2, pp. 384–393.

*Primary Examiner*—John W. Cabeca
*Assistant Examiner*—Pierre-Michel Bataille
*Attorney, Agent, or Firm*—Gunnison, McKay & Hodgson, L.L.P.; Philip McKay

[57] ABSTRACT

A cache memory system including a cache memory having a plurality of cache lines. An index portion of a tag array includes an n-bit pointer entry for every cache line. A shared tag portion of a tag array includes a number of entries, where each entry includes shared tag information that is shared among a plurality of the cache lines. Each n-bit pointer in the index portion of the tag array points into an entry in the shared tag portion.

2 Claims, 5 Drawing Sheets

CACHE WITH REDUCED TAG INFORMATION STORAGE

BACKGROUND OF THE INVENTION

1. Field of the Invention

The present invention relates, in general, to cache memory, and, more particularly, to a cache memory design using a reduced area for storing tag information used to access the cache memory.

2. Relevant Background

The ability of processors to execute instructions has typically outpaced the ability of memory subsystems to supply instructions and data to the processors. As used herein the terms "microprocessor" and "processor" include complete instruction set computers (CISC), reduced instruction set computers (RISC) and hybrids. Most processors use a cache memory system to speed memory access. Cache memory comprises one or more levels of dedicated high-speed memory holding recently accessed data, designed to speed up subsequent access to the same data.

Cache technology is based on a premise that programs frequently reuse the same instructions and data. When data is read from main system memory, a copy is also saved in the cache memory, along with the tag. The cache then monitors subsequent requests for data to see if the information needed has already been stored in the cache. If the data had indeed been stored in the cache, the data is delivered with low latency to the processor while the attempt to fetch the information from main memory is aborted (or not started). If, on the other hand, the data had not been previously stored in cache then it is fetched directly from main memory and also saved in cache for future access.

Another feature of access patterns to stored information is that they often exhibit "spatial locality". Spatial locality is a property that information (i.e., instructions and data) that is required to execute a program is often close in physical address space in the memory media (e.g., random access memory (RAM), disk storage, and the like) to other data that will be needed in the near future. Cache designs take limited advantage of spatial locality by filling the cache not only with information that is specifically requested, but also with additional information that is spatially near the specifically requested data. Efforts are also made to "prefetch" data that is spatially near specifically requested data.

A level 1 cache (L1 cache or L1$) is usually an internal cache built onto the same monolithic integrated circuit (IC) as the processor itself. On-chip cache is typically the fastest (i.e., lowest latency) because it is smaller in capacity and can be accessed at the speed of the internal components of the processor. It is contemplated that two or more levels of cache may be implemented on chip in which case the higher cache levels are slower than the L1 cache. On the other hand, off-chip cache (i.e., provided in a discrete integrated circuit separate from the processor) has much higher latency as the off-chip propagation delays are great and off-chip cache typically has very high capacity compared to on-chip cache structures. Off-chip cache has typically much shorter latency than accesses to main memory. In most designs, at least some high-level cache is provided off-chip.

Both on-chip and off-chip cache sizes of high-performance processors are continuously growing which tends to increase cache access latency relative to the processor. In contrast, processor clock speeds continually increase demanding more performance from the cache. For the foreseeable future, overall processor performance will often be limited by the cache and memory subsystem performance.

Each cache entry is typically accessed by an address tag stored separately in a tag random access memory (RAM). In a direct mapped cache each main memory address maps to a unique location in the cache. In fully associative cache, data from any main memory address can be stored in any cache location, hence, all address tags must be compared simultaneously (i.e., associatively) with the requested address, and if one matches, then its associated data is accessed. Set associative cache is a compromise between direct mapped cache and a fully associative cache where each address tag corresponds to a set of cache locations. A four-way set associative cache, for example, allows each address tag to map to four different cache locations.

Associative cache designs have a higher hit rate than similarly sized direct mapped caches and offer performance advantages in particular applications such as technical and scientific applications. Associative cache is more difficult to implement when the tag store information is located off-chip and in applications where each tag comprises a large number of bits. In a fully associative or set associative cache design, the processor references multiple tag store RAM locations simultaneously for best performance. This requires multiple parallel input/output (I/O) pins supporting communication between the processor and an off-chip tag store. For example, a 4-way set associative cache typically requires four times as many I/O pins between tag store and the processor than does a direct mapped cache for best performance. As physical memory addresses become larger, the number of I/O pins is unwieldy or impossible to implement. Many times these I/O pins simply are not available. For this reason, almost all external cache designs that are supported by a microprocessor are direct mapped.

The number of address tags required in the tag store is proportional to the size of the cache. However, not only the size, (i.e., the number of tag entries) but also the physical width of the address tag is typically growing because larger physical memories need to be addressed. Larger physical memory spaces require more address bits and correspondingly wider memory to store each address tag. The address tag RAM physical size or capacity is the product of these parameters and so is growing faster than the cache itself.

It is desirable to minimize access time to read the contents of the cache tag. The contents of the cache tag are read to determine if requested data exists in the cache or whether the data must be fetched from main memory or mass storage. The contents of the cache tag also provide address information needed to access the cached data. To minimize access latency to cache tag it is desirable to keep the cache tag information in low latency structures even for high latency caches and off-chip cache. However, because the area required by the cache tag is increasing faster than the cache itself, it is increasingly difficult to provide even the cache tag storage in low latency on-chip structures. A need exists for a cache design that reduces the area requirements for the tag store so that the tag information can be implemented on-chip and in small low latency structures.

One method of reducing the size of the cache tag store is to increase the atomic unit of information addressed by each cache tag. This can be done by increasing the "granularity" of the cache. The "granularity" of a particular cache level refers to the smallest quantity of data that can be addressed, often referred to as the size of a cache line. Larger cache lines hold more data in each line and so the address can be less specific (i.e., the address requires fewer bits). This also results in fewer cache lines for a given cache size which is the more important effect. However, larger cache lines frequently result in loading data into cache that is not used as an entire cache line is filled even for a small memory request. Hence, increasing granularity results in inefficient cache usage and wasted data bandwidth in many applications. Using a technique called sub-blocking, selected levels (usually higher cache levels) in a hierarchical cache have a higher tag granularity by providing a set of valid bits per tag. Each valid bit corresponds to the size of a cache line of the lower level cache. Hence, sub-blocking is a compromise that can be applied to improve cache efficiency of the lower cache levels while reducing the tag size of higher cache levels. Sub-blocking increases complexity of cache management, however, and in particular makes replacement more difficult. For example, sub-blocking is inefficient in inclusive cache designs.

The limitations of long latency cache pose particular problems in some processor applications. Particular examples include multiprocessing (MP) ma chines. In multiprocessors, instructions that incur a long latency memory access may result in stalling all instructions that operate on the long latency data. Typically the requesting processor will launch a memory access request and simultaneously broadcast a snoop request to all other processors. The other processors handle the snoop request by performing a tag store inquiry to identify whether a modified copy of the requested data exists in their cache. The requesting processor must wait until the inquiries are complete before committing itself to using the data obtained from the memory access re quests. Hence, it is desirable to minimize the portion of the snoop latency associated with accessing long latency tag store information.

In speculative execution processors, including uniprocessor and multiprocessor machines, some instructions cannot execute until a prior instruction is completed execution and their results are available. For example, an instruction that operates on d ata fetched from memory is dependent upon one or more preceding memory instructions (e.g., a load instruction) that fetch the required data from memory into working registers. The dependent instruction cannot execute until all of the stored values have been retrieved from memory. Also, some instructions determine an address for a subsequent memory access instruction and so the subsequent instruction cannot execute until the prior instruction's results are available. This results in a situation called "pointer chasing" that imposes the memory access latency on multiple instructions. In these applications and others, processor performance is very dependent on the latency to the various levels of cache and main memory.

SUMMARY OF THE INVENTION

The present invention involves a cache memory system having an cache comprising a plurality of cache lines. A tag array is provided comprising an index portion and a shared tag portion. The index portion includes an n-bit pointer and a unique tag portion for every cache line rather than the complete tag information. Desirably the structure in the index portion holding the pointer comprises a content addressable memory. Also, the shared tag portion is optionally implemented as a content addressable memory. The n-bit pointer points to an entry in the shared tag portion. The shared tag portion includes $2^n$ entries where each entry comprises tag information that is shared among a number of cache lines. The index portion and shared tag portion are optionally accessed in parallel during tag inquires and snoops.

In another aspect, the present invention involves a method for operation of an cache memory. Cache system accesses are generated where each access comprises a physical address identifying a memory location having data that is a target of the access. The physical address includes an index portion, a unique tag portion and a shared tag portion. A first lookup is performed using the index portion to access a unique address tag and a pointer associated with a cache line. The pointer is used to select a shared tag portion. The unique tag portion of the physical address is compared to the addressed unique tag portion. The shared tag portion of the physical address is compared with the selected shared tag. Alternatively, the first and second lookups are performed in parallel.

To perform a cache fill, when the shared portion of the tag to be inserted matches one of the entries in the shared tag array, a pointer to the matching entry is stored in the index entry for that cache line. When the shared portion of the tag to be inserted does not match any entry in the shared tag array, a shared tag in the shared tag array may be replaced or evicted. During eviction of a shared tag, all cache lines with a shared tag matching the evicted entry are evicted.

DESCRIPTION OF THE PREFERRED EMBODIMENTS

The present invention involves a method and apparatus for operating a processor using an external data cache that is particularly useful when information residing in the external data is clustered (i.e., exhibits a high degree of spatial locality). As used herein, a data cache may cache instructions and/or data hence the word "data" includes data that represents instructions. Clustered data (i.e., data with a high degree of spatial locality) results in the upper address bits, stored in a tag store RAM, that are identical for a number of cache lines. This upper address information is redundant and in accordance with the present invention need be stored only once. In general, the present invention provides an on-chip index that has an entry for each cache line. The index entry includes a pointer that points to an entry in an on-chip shared cache tag array. The shared cache tag array includes a number of entries where each entry includes a shared tag. Each shared tag appears only once in the shared tag array, thereby reducing the size of the tag array as compared to prior tag arrays that repeat the information now shared for each entry in which it is used. Lower address bits that uniquely identify the physical address are handled in a conventional manner. In a particular example, the smaller physical size of the combined index/shared array allows the tag information to be implemented on-chip (i.e., the same integrated circuit chip as the processor) for low latency access.

Figure 1:
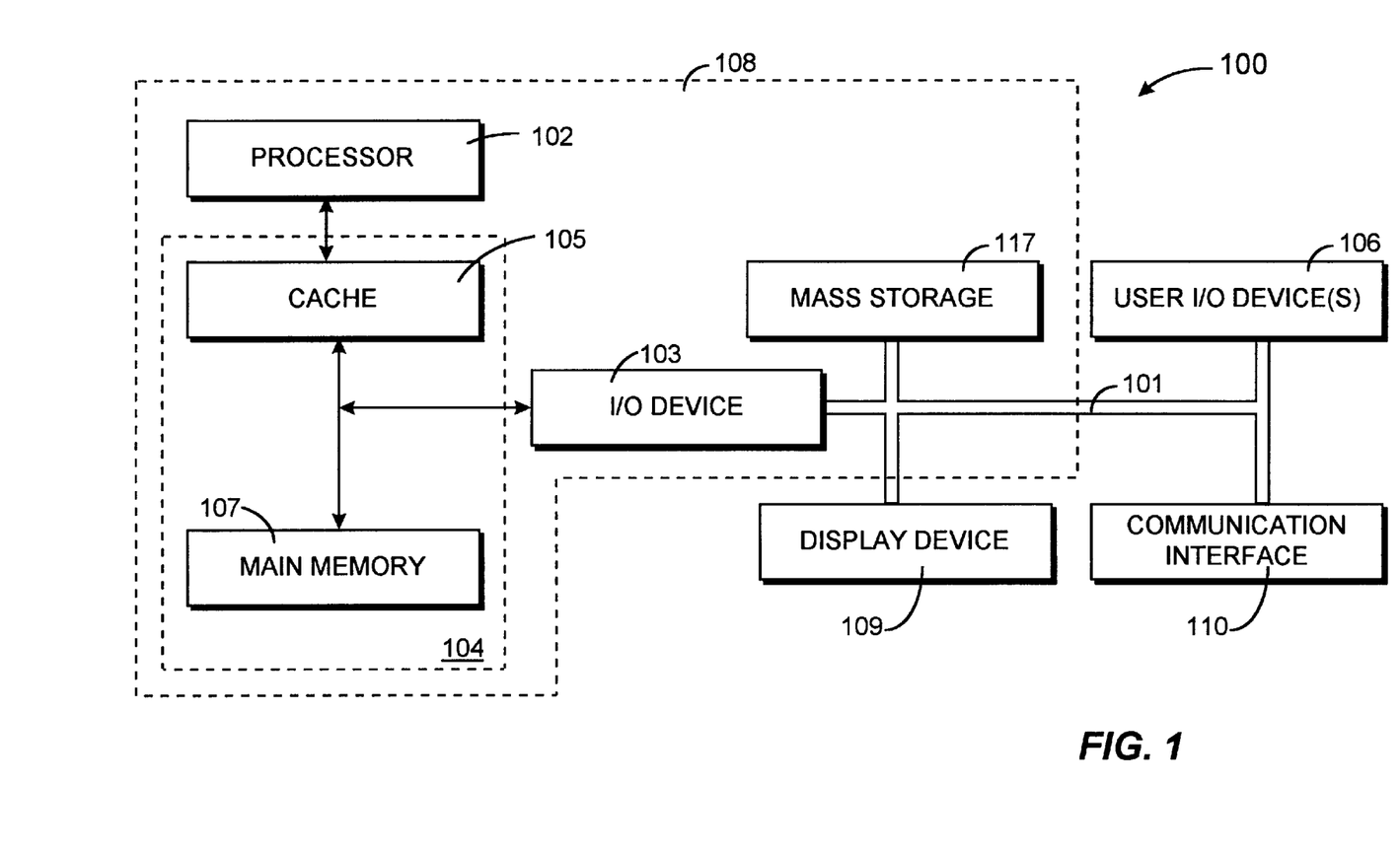
FIG. 1 shows in block diagram form a computer system incorporating an apparatus and system in accordance with the present invention.

Processor architectures can be represented as a collection of interacting functional units as shown in FIG. 1. These functional units, discussed in greater detail below, perform the functions of fetching instructions and data from memory, preprocessing fetched instructions, scheduling instructions to be executed, executing the instructions, managing memory transactions, and interfacing with external circuitry and devices.

Figure 2:
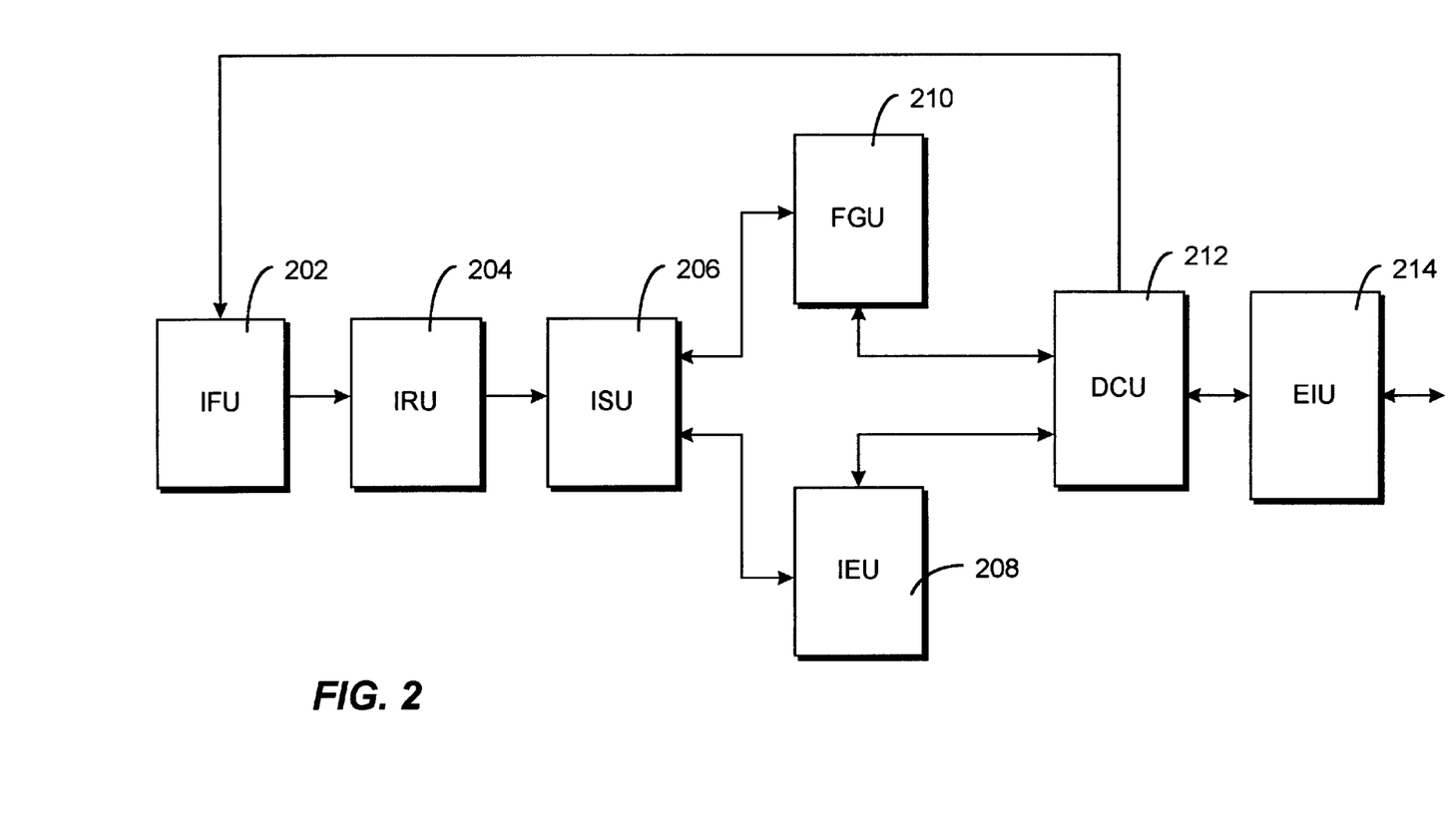
FIG. 2 shows a processor in block diagram form incorporating the apparatus and method in accordance with the present invention.

The present invention is described in terms of apparatus and method particularly useful in a superpipelined and superscalar processor 102 shown in block diagram form in FIG. 1 and FIG. 2. The particular examples represent implementations useful in high clock frequency operation and processors that issue and executing multiple instructions per cycle (IPC). However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical general purpose computer system 100 incorporating a processor 102 in accordance with the present invention. Computer system 100 in accordance with the present invention comprises an address/data bus 101 for communicating information, processor 102 coupled with bus 101 through input/output (I/O) device 103 for processing data and executing instructions, and memory system 104 coupled with bus 101 for storing information and instructions for processor 102. Memory system 104 comprises, for example, cache memory 105 and main memory 107. Cache memory 105 includes one or more levels of cache memory, at least one level of which is implemented on a separate integrated circuit from processor 102. In a typical embodiment, processor 102, I/O device 103, and some of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available input/output devices, include another computer. Mass storage device 117 is coupled to bus 101 may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O device 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD), a printer or any available equivalent.

FIG. 2 illustrates principle components of processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature is often used to identify equivalent functional units.

Instruction fetch unit (IFU) 202 comprises instruction fetch mechanisms and includes, among other things, an instruction cache (I$ 301 in FIG. 3), which is also a part of cache subsystem 212, for storing instructions, branch prediction logic, and address logic for addressing selected instructions in the instruction cache. The instruction cache is commonly referred to as a portion (I$) of the level one (L1) cache with another portion (D$) of the L1 cache dedicated to data storage. IFU 202 fetches one or more instructions at a time by appropriately addressing instruction cache 301. Typically IFU 202 generates logical or virtual addresses to a translation lookaside buffer 311 (shown in FIG. 3) which in turn generates physical addresses used by cache unit 212. The instruction cache 301 feeds addressed instructions to instruction rename unit (IRU) 204.

In the absence of conditional branch instruction, IFU 202 addresses the instruction cache sequentially. The branch prediction logic in IFU 202 handles branch instructions, including unconditional branches. An outcome tree of each branch instruction is formed using any of a variety of available branch prediction algorithms and mechanisms. More than one branch can be predicted simultaneously by supplying sufficient branch prediction resources. After the branches are predicted, the address of the predicted branch is applied to instruction cache 301 rather than the next sequential address.

IRU 204 comprises one or more pipeline stages that include instruction renaming and dependency checking mechanisms. The instruction renaming mechanism is operative to map register specifiers in the instructions to physical register locations and to perform register renaming to prevent certain types of dependencies. IRU 204 further comprises dependency checking mechanisms that analyze the instructions to determine if the operands (identified by the instructions' register specifiers) cannot be determined until another "live instruction" has completed. The term "live instruction" as used herein refers to any instruction that has been fetched but has not yet completed or been retired. IRU 204 outputs renamed instructions to instruction scheduling unit (ISU) 206.

ISU 206 receives renamed instructions from IRU 204 and registers them for execution. ISU 206 is operative to schedule and dispatch instructions as soon as their dependencies have been satisfied into an appropriate execution unit (e.g., integer execution unit (IEU) 208, or floating point and graphics unit (FGU) 210). ISU 206 also maintains trap status of live instructions. ISU 206 may perform other functions such as maintaining the correct architectural state of processor 102, including state maintenance when out-of-order instruction processing is used. ISU 206 may include mechanisms to redirect execution appropriately when traps or interrupts occur.

ISU 206 also operates to retire executed instructions when completed by IEU 208 and FGU 210. ISU 206 performs the appropriate updates to architectural register files and condition code registers upon complete execution of an instruction. ISU 206 is responsive to exception conditions and discards or flushes operations being performed on instructions subsequent to an instruction generating an exception in the program order. ISU 206 quickly removes instructions from a mispredicted branch and initiates IFU 202 to fetch from the correct branch. An instruction is retired when it has finished execution and all prior instructions have completed. Upon retirement the instruction's result is written into the appropriate register file.

IEU 208 includes one or more pipelines, each pipeline comprising one or more stages that implement integer instructions. IEU 208 also includes mechanisms for holding the results and state of speculatively executed integer instructions. IEU 208 functions to perform final decoding of integer instructions before they are executed on the execution units and to determine operand bypassing amongst instructions in a processor. In the particular implementation described herein, IEU 208 executes all integer instructions including determining correct virtual addresses for load/store instructions. IEU 208 also maintains correct architectural register state for a plurality of integer registers in processor 102.

FGU 210, includes one or more pipelines, each comprising one or more stages that implement floating point instructions. FGU 210 also includes mechanisms for holding the results and state of speculatively executed floating point and graphic instructions. FGU 210 functions to perform final decoding of floating point instructions before they are executed on the execution units. In the specific example, FGU 210 also includes one or more pipelines dedicated to implement special purpose multimedia and graphic instructions that are extensions to standard architectural instructions for a processor. FGU 210 may be equivalently substituted with a floating point unit (FPU) in designs in which special purpose graphic and multimedia instructions are not used.

A data cache memory unit (DCU) 212, including cache memory 105 shown in FIG. 1, functions to cache memory reads from off-chip memory 107 through external interface unit (EIU) 214. Optionally, DCU 212 also caches memory write transactions. DCU 212 comprises one or more hierarchical levels of cache memory 105 and the associated logic to control the cache memory 105. One or more of the cache levels within DCU 212 may be read-only memory (from the processor's point of view) to eliminate the logic associated with cache writes.

Figure 3:
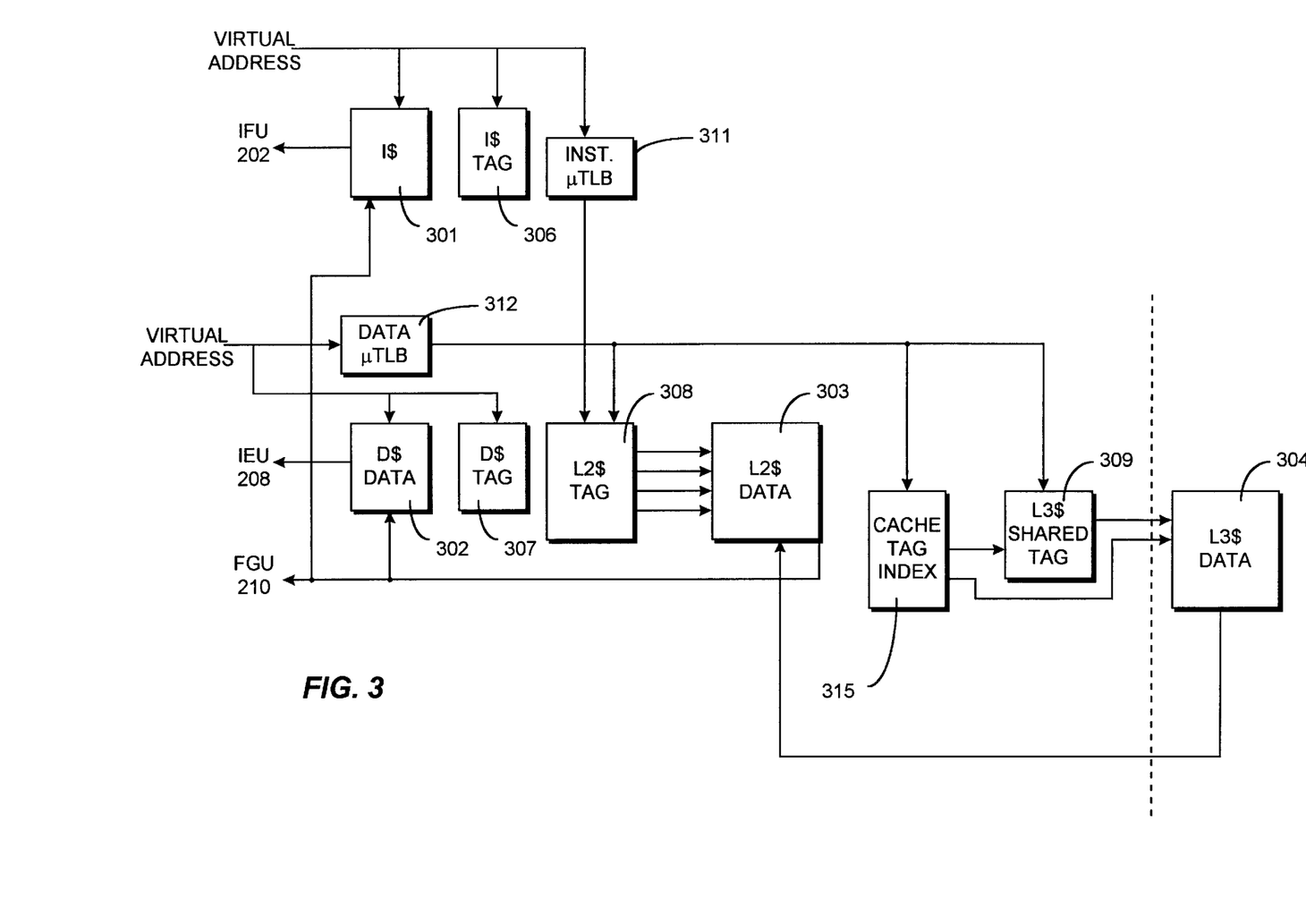
FIG. 3 illustrates in block diagram form a high level overview of a cache subsystem in accordance with the present invention.

DCU 212 in accordance with the present invention is illustrated in greater detail in FIG. 3. DCU 212, alternatively referred to as the data cache subsystem, comprises separate instruction cache 301 and data cache 302 (labeled I$ and D$ in FIG. 3). In a typical implementation, although, a unified instruction/data cache is an equivalent substitute in some applications. Using separate caches 301 and 302 to store recently used instructions and recently accessed data increases efficiency in many applications. The first level caches I$ 301 and D$ 302 are virtually indexed and physically tagged in a specific embodiment. These caches have each line indexed by virtual address, however the tag bits are from the physical address determined after the virtual address is translated. I$ 301 and D$ 302 may be implemented as direct mapped, n-way set associative, or fully associative caches to meet the needs of a particular application. Accordingly, these other implementations are equivalent to the specific embodiments described herein for purposes of the present invention.

A unified on-chip level 2 cache 303 (labeled L2$ DATA), and a unified external level 3 cache 304 (labeled L3$ DATA) are also used. Associated with each cache 301–303 is a conventional tag array 306–308 respectively that stores address tag information relating to the data stored in the associated cache. The addresses stored in the tag arrays 306–308 are the physical addresses from main memory 107 that have data corresponding to the data or instructions held in the cache 301–303 associated with the tag array 306–308.

The tag mechanism for the L3 cache comprise cache tag index 315 and a shared tag array 309. Tag index 315 and shared tag array 309 are preferably implemented on-chip while L3 cache 304 is implemented off-chip as suggested by the dashed vertical line in FIG. 3. Cache tag index 315 and shared tag array 309 receive the tag portion (i.e., the upper physical address bits) from the translation lookaside buffers 311 and 312. The lower address bits that indicate a particular cache line number are coupled to cache tag index 315. In this manner, lookup can be performed in parallel in index 315 and shared tag array 309 to reduce latency. Index 315 outputs a unique shared tag array 309 outputs a shared tag portion that can be compared to the corresponding portions of an applied physical address to determine if a particular access request hits or misses in L3 cache 304.

IFU 202 generates virtual addresses coupled to instruction cache 301 (when instruction cache 301 is virtually indexed) and to instruction micro-translation lookaside buffer ($\mu$TLB) 311 to enable instruction fetching from physically-addressed cache levels and main memory. In a particular example, IEU 208 includes one or more memory pipes generating virtual addresses to virtually indexed data cache 302 and to micro-translation lookaside buffer ($\mu$TLBs) 312 for integer and floating point load and store operations. Virtual to physical address translation occurs in a conventional manner through micro translation lookaside buffers ($\mu$TLBs) 311 and 312 that are hardware controlled subsets of a main translation lookaside buffer (TLB) (not shown). TLBs store the most-recently used virtual:physical address pairs to speed up memory access by reducing the time required to translate virtual addresses to physical addresses needed to address memory and cache. TLB misses are handled using any available technique, including hardware and software handling, to generate the virtual:physical pair when the pair does not exist in the TLB.

When a request is made for instructions at a particular address, a tag inquiry is performed by comparing the physical address from TLB 311 with the addresses in tag array 306. The physical address is also coupled, desirably in parallel, with L2$ tag array 308, L3$ cache tag index 315 and L3$ shared tag array 309. In this manner, tag inquiries are conducted in parallel to expedite results from all tag memories. Similarly, when a request is made for data at a particular address, a tag inquiry is performed by comparing the physical address from TLB 312 with the addresses in D$ tag array 307. The physical address is also coupled, desirably in parallel, with L2$ tag array 308, L3$ cache tag index 315 and shared tag array 309 to expedite results from all tag memories.

Each cache line is associated with one or more status bits that indicates whether the line is valid (i.e., filled with known correct and up-to-date data). If the address matches a valid address in the tag array (i.e., a cache read hit), the information is accessed from the cache memory; if not, then the main memory is accessed for the information that is then substituted into the cache memory for use by the data processing unit. In the case that the missing cache does not have a line allocated for the requested memory location, one is allocated. As the data is returned from higher cache levels or main memory, it is stored in the allocated line for future use.

When processor 102 attempts to write data to a cacheable area of memory, it first checks if a cache line for that memory location exists in one or more of caches 301–304. If a valid cache line does exist, processor 102 (depending on the write policy currently in force) can write the data into the cache 301–304 instead of (or in addition to) writing it out to main memory 107. This operation is called a "write hit". If a write misses the cache (i.e., a valid cache line is not present in the appropriate cache 301–304 for area of memory being written to), processor 102 performs a cache line fill by allocating a line for the requested data for a write allocate cache policy and by copying the data from a higher cache level or main memory into that line. Cache system 105 then writes the data from internal registers into the allocated cache line and (depending on the write policy currently in force) can also write the data to main memory 107. For ease of description and understanding the present invention is not illustrated with write back cache units that are commonly used to buffer data while it is written to higher cache levels. The use and design of write back buffers is well known, and any available technology may be used in accordance with the present invention. In a particular example, I$ 301, D$ 302, L2$ 303 and L3$ 304 are implemented as non-blocking caches.

To perform a cache fill in L3 cache 304, it is determined if the shared portion of the tag to be inserted matches one of the entries in shared tag array 309. When one of the entries matches, the pointer to the matching entry is stored in the pointer entry in index 315 for that cache line. When the shared portion of the tag to be inserted does not match any entry in shared tag array 309, a shared tag in shared tag array 309 is replaced. Replacing a shared tag is performed by evicting all cache lines in L3 cache 304 that have a matching pointer to the index of the evicted shared tag For this reason, it is desirable to implement the pointer portion of cache index 315 as a content addressable memory (CAM) device enabling multiple cache lines to be addressed and evicted simultaneously.

In a particular example, L3 cache 304 is set associative, although direct mapped designs may also be used. In set associative designs, a separate index 315 and shared tag array 309 are provided for each set in L3 cache 304. L3 cache 304 may be inclusive or non-inclusive and may use sub-blocking.

Figure 4:
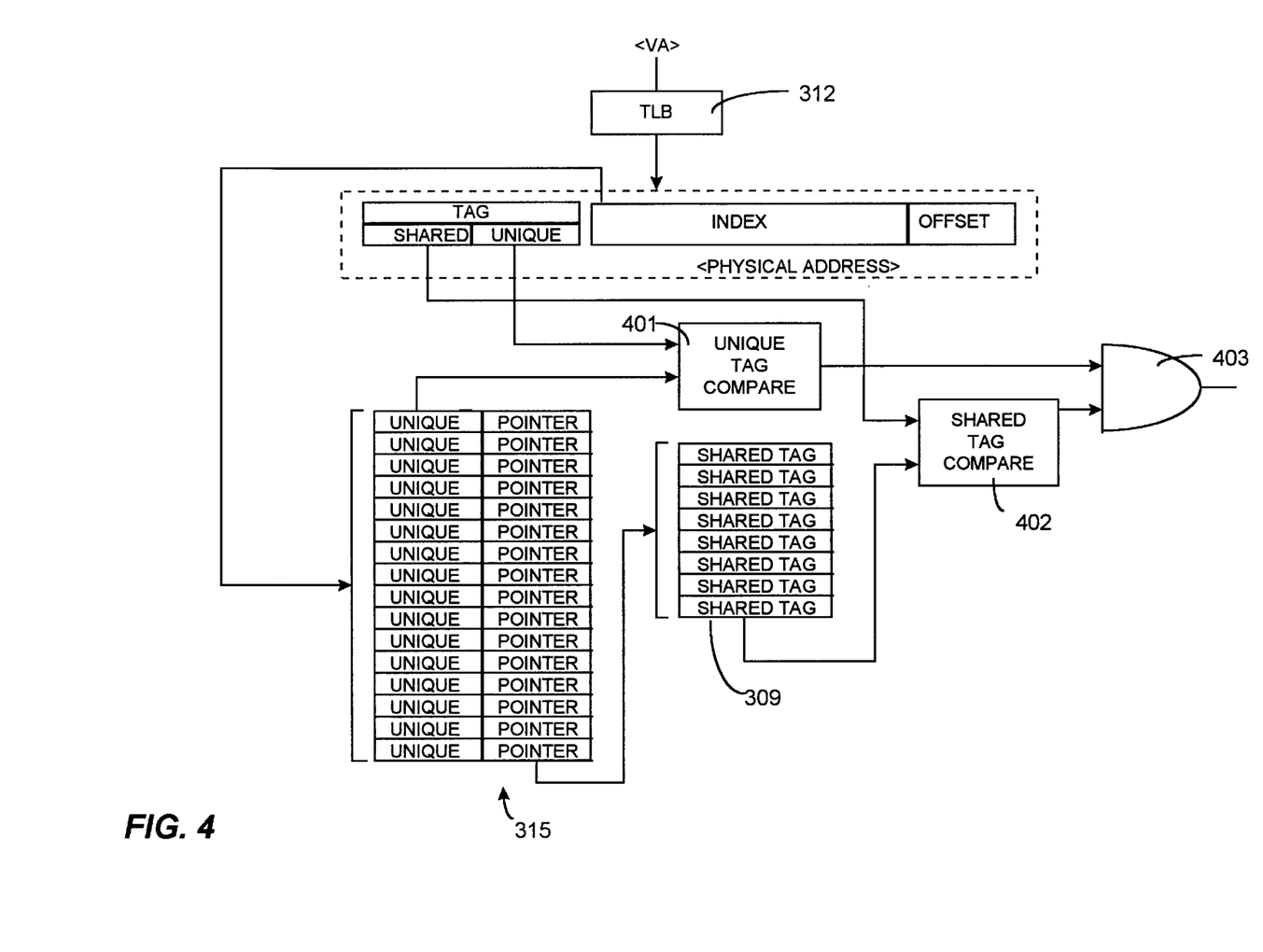
FIG. 4 shows an exemplary layout of a cache tag array in accordance with the present invention.

As shown in FIG. 4, cache index 315 comprises a plurality of entries, each entry corresponding to one of the cache lines in L3 cache 304. Each entry comprises an n-bit pointer, and one or more state bits (not shown) indicating current state of the represented cache line. Each n-bit pointer value is associated with or represents a specific entry in shared tag array 309. In the particular example of FIG. 4, shared tag array 309 comprises eight entries therefore each pointer in cache index 315 comprises a three-bit binary value. In other words, the number of entries in shared tag array 309 is $2^n$ where n is the number of bits in each pointer.

Translation of a virtual address to a physical address is performed in a conventional manner. The physical address tag comprises an offset m-bit index portion, a unique tag portion, and a shared tag portion. The index portion of the physical address is used to select an entry in cache index 315. Each entry in cache index 315 is associated with one cache line in L3 cache 304 and includes an entry or field holding unique tag information for the associated cache line. Each entry in index 315 also holds a pointer to shared tag portion 309.

During a cache access, a first lookup is performed by comparing the selected unique tag information with the unique tag portion of the physical address using unique tag compare unit 401. A second lookup is performed by comparing the shared tag portion of the physical address to the shared tag in shared tag array 309 identified by the selected pointer in cache index 315 using shared tag compare unit 402. A hit is indicated only when both unique tag compare 401 and shared tag compare 402 indicate matches. A hit signal is conveniently indicated by an AND combination of the output of pointer compare 401 and shared tag compare 402 using a logic AND gate 403.

To perform a cache fill, the unique tag portion, and pointer information must be updated. When the shared portion of the tag to be inserted matches one of the existing entries in shared tag array 309, a pointer to the matching entry is stored in the index entry in cache index 315 associated with that cache line. When the shared portion of the tag to be inserted does not match any entry in the shared tag array, a shared tag in shared tag array 309 may be replaced or evicted. During eviction of a shared tag, all cache lines with a shared tag matching the evicted entry are evicted and/or invalidated. To invalidate multiple entries in cache index 315 simultaneously, it is desirable to provide at least pointer portion as a content addressable memory (CAM) so that the address to shared tag array 305 (i.e., the path) of the evicted shared tag can be used to access all of the cache lines with a shared tag matching the evicted entry in parallel. A CAM structure is practical in many applications because the pointer field in each entry in index 315 comprises few bits. For example, if shared tag store 309 includes 256 entries, each pointer comprises $\log_2(256)$ or eight bits.

Experience with conventional cache designs suggests that even a modestly sized shared tag array 309 comprising 32 to 256 entries will typically provide enough space for all of the shared tag information for efficient operation. This is because the contents of L3 cache 304 at any given time typically comprise many lines from the same physical address range in main memory as a result of spatial locality of the data. Hence, the present invention is particularly useful when the data being fetched is characterized by a high degree of spatial locality.

Figure 5:
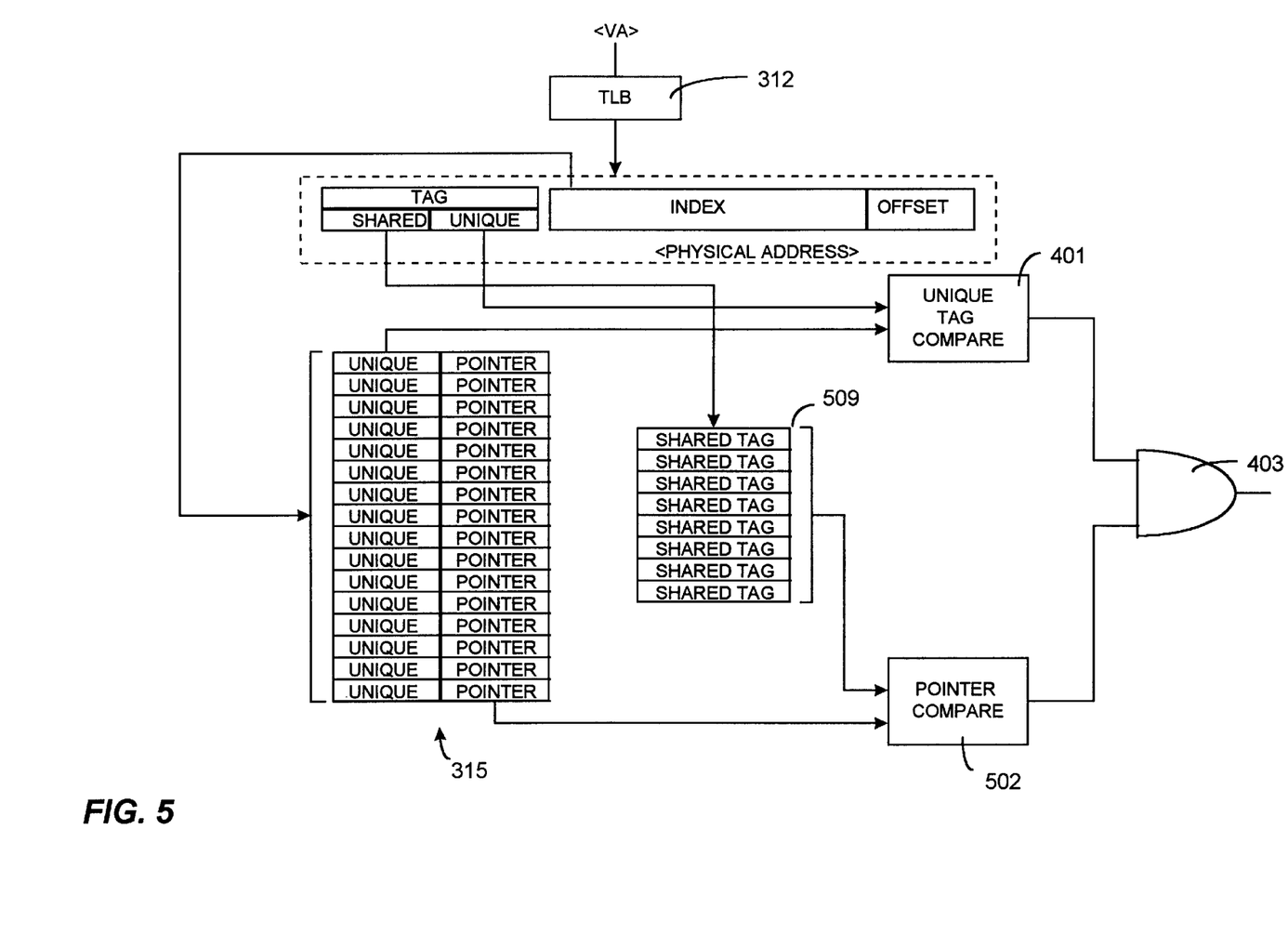
FIG. 5 shows an alternative embodiment layout of a cache tag array in accordance with the present invention.

FIG. 5 shows an alternative implementation in accordance with the present invention. A significant difference in the implementation shown in FIG. 5 is that shared tag information in shared tag store 509 is accessed in parallel with unique tag information in cache index 315. In the previous implementation shown in FIG. 4, the shared tag information is accessed after cache index 315 is accessed and so the unique tag compare unit 401 will have results available before shared tag compare unit 402. This delay is avoided in the implementation of FIG. 5 by directly addressing shared tag store 509 with the shared tag portion of the physical address at the same time that the index information from the physical address is used to address an entry in cache index 315. Preferably, shared tag store 509 is implemented as a content addressable memory (CAM). Shared tag store 509 essentially outputs the pointer value (i.e., address) indicating the location of a shared tag that matches the shared tag information from the physical address. This pointer value is then compared to the pointer value generated by cache index 315 in pointer compare unit 502. In this manner, pointer compare unit 502 can produce results in parallel with unique tag compare unit 401. In a well-balanced design, accessing the large cache index 315 and accessing the small, but content addressed shared tag store 509 requires a similar amount of time enabling parallel operation.

In the past, CAM structures have been avoided because they are complex structures compared to conventionally addressed memory and do not scale well to large tag structures. In accordance with the present invention, shared tag store 509 is reduced in size as a result of not storing redundant information. This efficiency and size reduction makes using a CAM structure practical in many applications.

Index 315 described hereinbefore has been a direct mapped structure. For a fully associative implementation of 315, the index or part of the index, respectively, is stored as part of the unique tag portion. Associative implementation is consistent with both the serial lookup embodiment shown in FIG. 4 and the parallel lookup shown in FIG. 5.

Shared tag 309 described hereinbefore has been a fully associate structure. Set-associative or direct mapped structures are possible as well. For set-associative or direct mapped structures part of the shared tag becomes the index to this structure and those bits do not need to be stored as part of the shared tag anymore. Those implementations are consistent with both the serial lookup embodiment shown in FIG. 4 and the parallel lookup shown in FIG. 5.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention as claimed. For example, although a single shared tag array is described per cache, it is contemplated that multiple shared tags may themselves be split into a pointer portion and a shared portion. In this manner the present invention can be recursively applied to further reduce the space required to store tag information without impacting cache latency. Also, in set-associative caches, the shared tag structure in accordance with the present invention can be duplicated on a way-by-way basis. These and other modifications and extensions of the present invention are within the scope and spirit of the invention, as hereinafter claimed.

We claim:

1. In a processor that executes coded instructions, a method for operation of a cache memory having a cache tag array storing address tag information, the method comprising the steps of:

generating cache system accesses, where each access comprises a physical address identifying a memory location having data that is a target of the access, wherein the physical address includes an index portion a unique tag portion, and a shared tag portion;

performing a first lookup to compare the unique tag portion of the physical address with a unique tag portion of a tag entry for the corresponding line portion;

selecting one of the shared tags;

performing a second lookup to compare the shared portion of the physical address with the selected shared tag;

combining the results of the first and second lookup to determine if the access request hits in the cache;

performing a cache fill operation such that when the shared portion of the tag to be inserted matches one of the existing entries in the shared tag portion, storing a pointer to the matching entry in the index entry for that cache line and when the shared portion of the tag to be inserted does not match any entry in the shared tag potion, replacing a selected one shared tag in the shared tag array, wherein the replacing comprises evicting all index entries having a shared tag matching the shared tag selected for replacement.

2. The method of claim 1 wherein the first and second lookups are performed in parallel.

* * * * *

UNITED STATES PATENT AND TRADEMARK OFFICE
CERTIFICATE OF CORRECTION

PATENT NO. : 6,122,709
DATED : Sepember 19, 2000
INVENTOR(S) : Thomas M. Wicki, Meera Kasinathan and Ricky C. Hetherington It is certified that error appears in the above-identified patent and that said Letters Patent is hereby corrected as shown below:

Column 12,
Line 9, insert -- , -- after "portion".

Signed and Sealed this

Twenty-third Day of April, 2002

Attest:

*Attesting Officer*

JAMES E. ROGAN
*Director of the United States Patent and Trademark Office*